2,861,074
Patented Nov. 18, 1958

2,861,074

SUBSTITUTED HYDROXYERGOLENES

Edmund C. Kornfeld, Indianapolis, and Granville Bruce Kline, Greenwood, Ind., assignors to Eli Lilly and Company, Indianapolis, Ind., a corporation of Indiana No Drawing. Application October 22, 1956
Serial No. 617,248

5 Claims. (Cl. 260—285.5)

This invention relates to ergolenes and particularly to certain new substituted 9-hydroxy-7-methyl-$\Delta^{10}$-ergolenes and the process for their preparation.

The bases of the compounds of the present invention can be represented by the formula

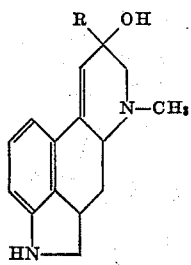

wherein R represents a lower aliphatic or a monocarbocyclic aromatic radical. Illustrative examples of radicals which are represented by R in the above formula are the methyl, isobutyl, hexyl, allyl and phenyl radicals. Other radicals equivalent to those set forth above include the alkoxyalkyl, alkylphenyl, alkoxyphenyl, halophenyl and the like radicals.

The new substituted hydroxyergolenes of the present invention and their acid addition salts have useful physiological activity. They produce contraction of the uterus similar to that obtained with ergonovine; thus, when employed in the same way as ergonovine, they are characterized by their oxytocic activity. Further, when injected parenterally, the compounds have hypothermic activity and therefore lower the body temperature. They also exert certain action upon the central nervous system of mammals and are useful drugs for the study of mental disease.

Broadly speaking, the new compounds are prepared by the action of suitably substituted organo-lithium compounds or Grignard reagents upon 9-keto-7-methyl-$\Delta^{10}$-ergolene. The resulting substituted ergolenes can be isolated from the reaction mixture by customary isolation procedures, for example, by taking advantage of their solubility in dilute acids.

The bases of the invention contain two nitrogen atoms which are capable of reacting with acids in the usual way to form acid addition salts. Such salts are readily prepared by the usual methods of the art, as for example, the reaction of stoichiometrically equivalent amounts of the base and a selected acid in a mutual inert solvent. Examples nontoxic of acids which are suitable for the preparation of acid addition salts of the invention are inorganic acids, for example, hydrochloric, nitric, sulfuric, phosphoric and the like acids; and organic acids, for example, benzoic, acetic, propionic, maleic, citric and the like acids.

The following examples will more specifically illustrate the preparation of the novel compounds.

EXAMPLE 1

Preparation of 9-hydroxy-7,9-dimethyl-$\Delta^{10}$-ergolene

To a stirred suspension of 14.6 g. (2.08 mols) of lithium ribbon in 350 ml. of dry ether were slowly added 148 g. (1.04 mols) of methyl iodide. The solution was stirred for about one-half hour after the addition of the methyl iodide was completed, and to the resulting mixture was added slowly and while cooling in an ice bath, 200 ml. of warm anisole containing in solution 10 g. (0.04 mol.) of 9-keto-7-methyl-$\Delta^{10}$-ergolene, which had previously been prepared according to the method disclosed in the report of Kornfeld et al., J. Am. Chem. Soc., 78:3087–3114 (1956). The reaction mixture was stirred for several hours at room temperature, and after standing overnight was decomposed by the slow addition of 150 ml. of ice water. A precipitate consisting of 9-hydroxy-7,9-dimethyl-$\Delta^{10}$-ergolene formed and was removed from the 2-phase system by filtration. After recrystallization from methanol, the 9-hydroxy-7,9-dimethyl-$\Delta^{10}$-ergolene thus prepared melted at about 206–208° C.

Analysis.—Calculated for $C_{16}H_{20}N_2O$: C, 74.96; H, 7.86; N, 10.93. Found: C, 75.01; H, 7.98; N, 10.82.

An additional amount of 9-hydroxy-7,9-dimethyl-$\Delta^{10}$-ergolene was obtained by extraction of the ether-anisole phase which resulted from decomposition of the reaction mixture with dilute hydrochloric acid, neutralization of the acid with sodium bicarbonate and extraction of the neutral aqueous extract with chloroform, followed by evaporation of the chloroform.

The dihydrochloride salt of 9-hydroxy-7,9-dimethyl-$\Delta^{10}$-ergolene is prepared by dissolving one gram of 9-hydroxy-7,9-dimethyl-$\Delta^{10}$-ergolene in 25 ml. of anhydrous ethanol, and passing dry hydrogen chloride gas through the solution until precipitation of the dihydrochloride salt is complete. The white precipitate of 9-hydroxy-7,9-dimethyl-$\Delta^{10}$-ergolene dihydrochloride is removed by filtration, washed with anhydrous ether and dried in air.

By proceeding in the same manner, but using stoichiometrically equivalent amounts of nitric, phosphoric, acetic and maleic acids, there are produced the corresponding 9-hydroxy-7,9-dimethyl-$\Delta^{10}$-ergolene dinitrate, 9-hydroxy-7,9-dimethyl-$\Delta^{10}$-ergolene phosphate, 9-hydroxy-7,9-dimethyl-$\Delta^{10}$-ergolene diacetate and 9-hydroxy-7,9-dimethyl-$\Delta^{10}$-ergolene maleate.

EXAMPLE 2

Preparation of 9-ethyl-9-hydroxy-7-methyl-$\Delta^{10}$-ergolene

A Grignard reagent was prepared by the reaction of 113 g. of ethyl bromide, 25.4 g. of magnesium and 350 ml. of ether. The resulting solution was cooled in ice and thereto was added with stirring and over a period of about twenty minutes a solution of 10 g. of 9-keto-7-methyl-$\Delta^{10}$-ergolene in 200 ml. of warm anisole. The reaction mixture was stirred for a further period of two hours at room temperature and then allowed to stand overnight. To the resulting reaction mixture were added 140 ml. of saturated aqueous ammonium chloride solution, while cooling in ice, to decompose the Grignard complex. The organic layer was decanted, and the residue remaining in the flask was extracted with about 100 ml. of chloroform. To the extracted residue were added about 25 ml. of 50 percent aqueous sodium hydroxide, and the alkaline mixture was extracted with another 100 ml. portion of chloroform. The combined extracts and the organic layer from the reaction were washed with water and then extracted with three 100 ml. portions of water each of which contained 5 ml. of concentrated hydrochloric acid. The combined acid extracts were decolorized with activated carbon, neutralized with an excess of solid sodium bicarbonate and extracted with four 75 ml. portions of warm chloroform. The combined chloroform extracts were dried over anhydrous magnesium sulfate, while keeping the solution warm, and the dried chloroform extracts were evaporated in vacuo to remove the solvent. The residue was taken up in a small amount of methanol and the insoluble material, consisting of 9-ethyl-9-hydroxy-7-methyl-$\Delta^{10}$-ergolene, was removed by filtration and washed with methanol and ether. After recrystallization from methanol, 9-ethyl-9-hydroxy-7-methyl-$\Delta^{10}$-ergolene thus prepared melted at about 204–206° C. with decomposition.

*Analysis.*—Calculated for $C_{17}H_{22}N_2O$: C, 75.52; H, 8.20; N, 10.36. Found: C, 74.65; H, 8.12; N, 10.29.

EXAMPLE 3

*Preparation of 9-allyl-9-hydroxy-7-methyl-$\Delta^{10}$-ergolene*

An allyl Grignard reagent was prepared by adding a solution of 126 g. of allyl bromide in 625 ml. of dry ether to a stirred suspension of 76 g. of magnesium in 250 ml. of ether, over a period of about six hours. Stirring was continued for about fifteen minutes after all of the allyl bromide had been added, and thereafter the reaction mixture was cooled in an ice bath. To the cooled Grignard reagent was added with stirring over a period of about ten minutes a solution of 10.0 g. of 9-keto-7-methyl-$\Delta^{10}$-ergolene in 200 ml. of warm anisole. Stirring was continued for about three hours at room temperature and the mixture was allowed to stand at room temperature overnight. The reaction mixture was then cooled and 140 ml. of saturated aqueous ammonium chloride solution were added thereto. To this mixture were added 300 ml. of ethyl acetate, and the organic layer was decanted. The remaining aqueous solution was extracted with successive 100 ml. portions of ethyl acetate and chloroform. Fifty ml. of 50 percent aqueous sodium hydroxide were then added to the residue, which was again extracted with a 100 ml. portion of chloroform. The combined organic layer and organic extracts were extracted with five successive 100 ml. portions of water, each containing 5 ml. of concentrated hydrochloric acid. The resulting acid extracts were combined, neutralized with excess solid sodium bicarbonate, and extracted wtih three 200 ml. portions of chloroform. The combined chloroform extracts were dried over anhydrous magnesium sulfate and evaporated to dryness in vacuo. The resulting residue, consisting of 9-allyl-9-hydroxy-7-methyl-$\Delta^{10}$-ergolene was digested with about 25 ml. of methanol, filtered and washed with methanol followed by ether. The resulting solid was recrystallized from ethanol.

9-allyl-9-hydroxy-7-methyl-$\Delta^{10}$-ergolene thus prepared melted at about 198–202° C. with decomposition.

*Analysis.*—Calculated for $C_{18}H_{22}N_2O$: C, 76.56; H, 7.85; N, 9.92. Found: C, 77.00; H, 8.34; N, 9.59.

EXAMPLE 4

*Preparation of 9-hydroxy-7-methyl-9-phenyl-$\Delta^{10}$-ergolene*

A phenyl Grignard reagent was prepared in the usual way from 15.7 g. of bromobenzene and 2.9 g. of magnesium, in 200 ml. of absolute ether. To the Grignard reagent was added a solution of 4.8 g. of 9-keto-7-methyl-$\Delta^{10}$-ergolene in 50 ml. of dioxane with stirring over a period of about ten minutes. Stirring was continued for about two hours at room temperature, and the reaction mixture was allowed to stand at room temperature overnight. To the cooled reaction mixture were added 27 ml. of saturated aqueous ammonium chloride solution, and the ether layer was removed from the resulting 2-phase system by decantation. The residual aqueous solution was extracted with successive 25 ml. portions of ether and chloroform, and the combined extracts were dried over anhydrous magnesium sulfate and evaporated to dryness in vacuo. The residue, consisting of 9-hydroxy-7-methyl-9-phenyl-$\Delta^{10}$-ergolene, was recrystallized from ethanol and melted with decomposition at about 219–220° C.

*Analysis.*—Calculated for $C_{21}H_{22}N_2O$: C, 79.21; H, 9.96; N, 8.80. Found: C, 79.12; H, 7.05; N, 8.67.

We claim:

1. A compound selected from the group consisting of bases represented by the formula

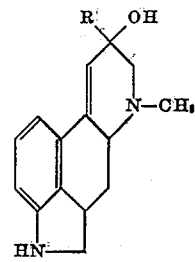

wherein R represents a member of the group consisting of lower alkyl, lower alkenyl, and monocarbocyclic aromatic hydrocarbon radicals, and nontoxic acid addition salts thereof.

2. 9-hydroxy-7-methyl-9-phenyl-$\Delta^{10}$-ergolene.
3. 9-hydroxy-7,9-dimethyl-$\Delta^{10}$-ergolene.
4. 9-ethyl-9-hydroxy-7-methyl-$\Delta^{10}$-ergolene.
5. 9-allyl-9-hydroxy-7-methyl-$\Delta^{10}$-ergolene.

References Cited in the file of this patent

UNITED STATES PATENTS 2,796,419    Kornfeld et al. _____ Sept. 27, 1954

OTHER REFERENCES

Kornfeld: Jour. Am. Chem. Soc., vol. 78, 1956 (pages 3087–3114).